April 9, 1929.　　　W. D. HAMERSTADT　　　1,708,269
PULLEY CONSTRUCTION
Filed Sept. 26, 1927　　　2 Sheets-Sheet 1

INVENTOR.
WILLIAM D. HAMERSTADT.
BY
ATTORNEYS.

April 9, 1929.                W. D. HAMERSTADT                1,708,269
                                PULLEY CONSTRUCTION
                              Filed Sept. 26, 1927         2 Sheets-Sheet 2

INVENTOR.
WILLIAM D. HAMERSTADT.

BY
ATTORNEYS

Patented Apr. 9, 1929.

1,708,269

UNITED STATES PATENT OFFICE.

WILLIAM D. HAMERSTADT, OF INDIANAPOLIS, INDIANA, ASSIGNOR TO ROCKWOOD MANUFACTURING COMPANY, OF INDIANAPOLIS, INDIANA, A CORPORATION.

PULLEY CONSTRUCTION.

Application filed September 26, 1927. Serial No. 221,915.

This invention relates to a paper pulley construction.

One object of the invention is to provide an end plate and combination bushing for paper pulleys and the like.

Another object of the invention is to construct a pulley with a combination end plate and bushing which is adapted to serve as an anchorage for the spider arms and which spider arms are suitably secured to a hub.

One feature of the invention consists in the formation of an end plate with a depressed portion or portions suitable for anchorage intermediate the inner and outer ends of the plate and an inturned flange or bushing on or adjacent the inner edge of the plate.

Another feature of the invention consists in the formation of a pulley by spot welding or otherwise welding, the spider arms to the bushing portion of a combination end plate and bushing, and also securing by a similar manner, or otherwise, the inner ends of said arms to a hub of cast iron or of similar suitable material.

Figure 1:
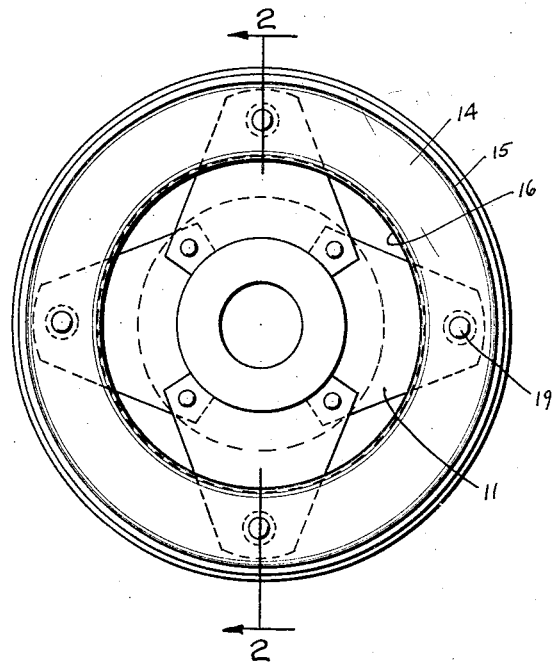
Figure 2:
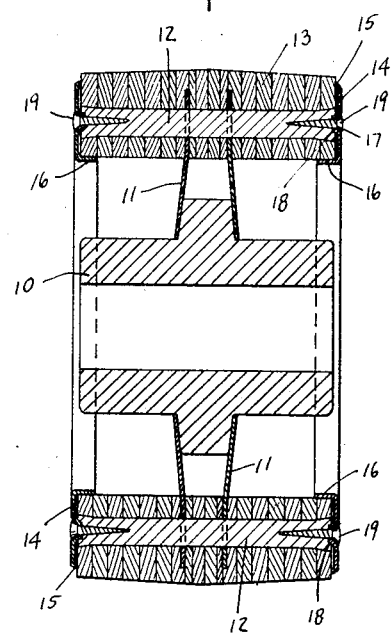
Figure 3:
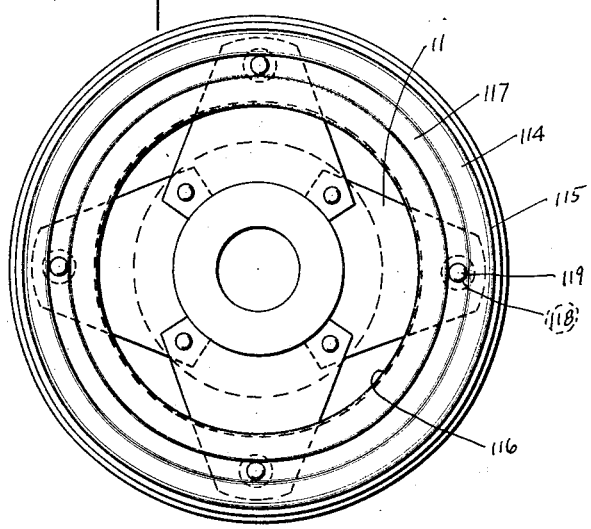
Figure 4:
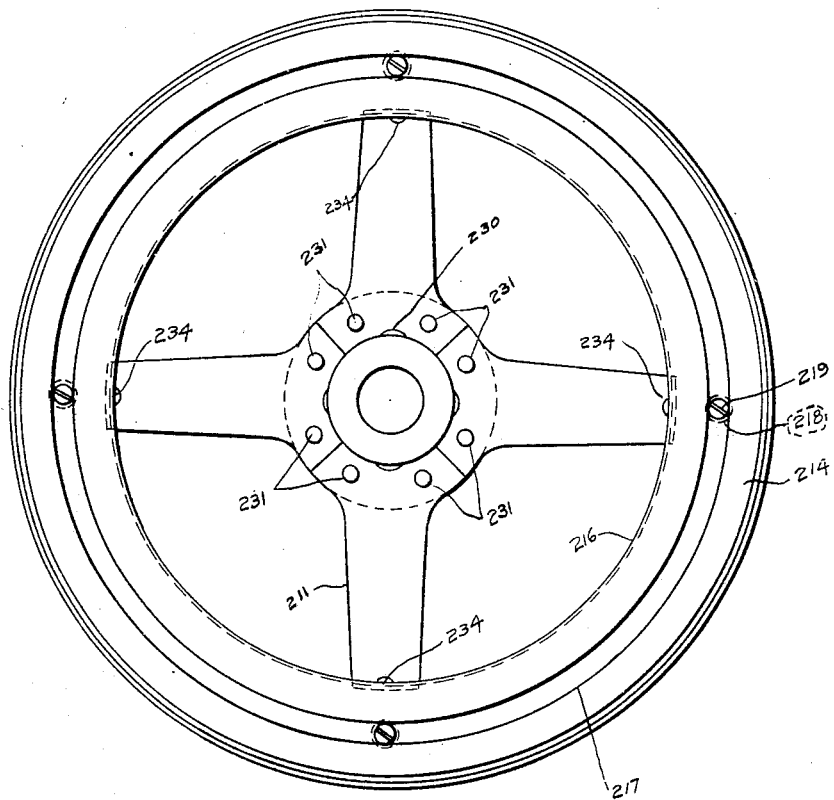
Figure 5:
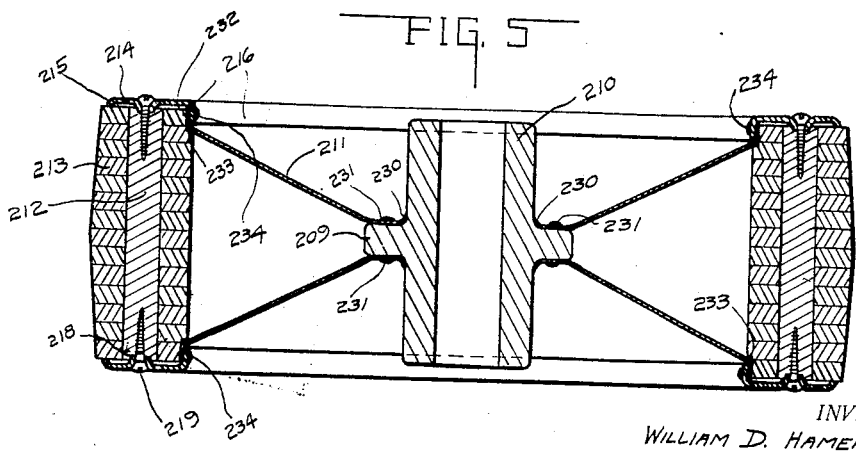

The full nature of the invention will be understood from the accompanying drawings and the following description and claims:

Fig. 1 is a side view of a pulley showing an end plate mounted thereon. Fig. 2 is a central section taken on line 2—2 of Fig. 1 and in the direction of the arrows. Fig. 3 is a side view of a modified form of the invention. Fig. 4 is a side elevation of a pulley embodying the invention including the end plate and arms directly secured thereto. Fig. 5 is a central sectional view of the modification shown in Fig. 4.

In the drawings 10 indicates a conventional hub having a plurality of spider-forming arms 11 which are anchored by means of pins or wooden dowels 12 to the laminated paper pulley construction 13, the sheets thereof being secured in abuttable relation by being mounted on the dowels under considerable pressure. The foregoing constitutes no part of the present invention.

The annular pulley-forming periphery or rim at each side is herein shown provided with an end plate 14 which has a slightly inturned flange at its outer edge 15 and a relatively larger inturned flange or bushing 16 at its inner edge, the same being nestingly received by the inner wall of the annular pulley rim. The plate 14 at suitable intervals is apertured as at 17 and the walls thereof are countersunk and project inwardly as at 18 to penetrate the dowel 12 and be anchored thereto. A screw-type nail 19 is driven into the dowel and the head of said nail is seatable in the countersunk or aperture recess.

As a result of the foregoing construction the end of the annular paper pulley rim is protected against mechanical wear by the end plate and the inner edge of the outer or end layer is also protected by the bushing 16. This construction also has the advantage of a better appearance than heretofore has been obtainable. The end plate, as shown, has its main body portion slightly spaced from the end of the paper pulley but bears thereon at the countersunk hole and at the outer and inner flange. It will be noted that the end plate does not extend to the outer periphery of the pulley rim but terminates short thereof, and since the inturned edge 15 is provided, a firm anchorage is obtained for the end plate and at the same time by reason of the termination short of the periphery of the pulley full width of belt contact is possible for the pulley in operation.

In Fig. 3 a modified form of the invention is illustrated and in this form the end plate 114 includes the inturned exterior flange 115 and the inturned interior flange 116. However, an annular depressed groove 117 is positioned intermediate the inner and outer edges and bears on the dowels and the end of the paper pulley rim. The annular portion is apertured as at 118 to receive the dowel receivable anchoring members 119.

In Figs. 4 and 5 a modified form of the invention is illustrated in which 212 indicates the dowels, 213 the annular fibre board sections, 215 the inturned flange bearing on the end section, said flange being the outer peripheral edge of the end plate 214 which has an inturned bushing portion 216. The hub 210 has a central collar 209 and secured thereto are the spider arms 211 by the spot welding 230 at the junction and 231. The arms extend radially outwardly and divergingly from each other and the outer ends 232 lie in grooves 233 formed in the annular pulley body portion and normally covered by the inturned bushing portion 216 and the spot welding 234 unites the bushing to the arms. If desired each end ring may have the annular portion 217 similar to the portion 117 in the modification shown in Fig. 3. The several pins or nails 219 are received by the countersunk holes 218 which have the walls thereof projecting inwardly to penetrate the dowel as shown. The nail 219 of the screw type is seatable in the countersunk portion or seat.

The invention claimed is:

1. In a paper pulley, the combination of an annular end portion, a metallic hub, a plurality of spider arms extending radially outwardly therefrom toward the end portion, and an annular end plate including an inturned inner edge mounted upon said annular end portion and united to the free ends of said spider arms for securing the annular end portion to the hub.

2. A device of the character defined by claim 1, characterized by said annular end plate including an annular corrugation concentric with the inturned portion.

3. A device as defined by claim 1, characterized by the annular end portion including a longitudinal recess at its inner edge for receiving the free end of said spider arm and said inturned portion of said annular end plate normally covering said recess and the end of the arm mounted therein.

4. In a paper pulley, the combination of an annular end portion, a metallic hub, a plurality of spider arms extending radially outwardly therefrom toward the end portion, said arms being spot welded at their inner ends to said hub, and an annular end plate including an inturned inner flange mounted upon said annular end portion and spot welded to the free ends of said spider arms for securing the annular end portion to the hub.

5. In a paper pulley and the like the combination of an annular end portion, an annular end plate including an in-turned outer edge for clampingly engaging the end portion and an inner in-turned edge telescoping the end portion, said end plate including an intermediate depressed portion extending toward the end portion and suitably apertured, and means for securing the plate to the end portion and seatable in said aperture.

In witness whereof, I have hereunto affixed my signature.

WILLIAM D. HAMERSTADT